(12) United States Patent
Kim (10) Patent No.: US 8,080,904 B2
(45) Date of Patent: Dec. 20, 2011

(54) POWER SUPPLY AND NIGHT VISION DEVICE USING THE POWER SUPPLY

(75) Inventor: Doo-Hwan Kim, Incheon (KR)

(73) Assignee: EOSYSTEM Co., Ltd., Incheon (KR)

( * ) Notice: Subject to any disclaimer, the term of this patent is extended or adjusted under 35 U.S.C. 154(b) by 1200 days.

(21) Appl. No.: 10/548,989

(22) PCT Filed: Dec. 23, 2003

(86) PCT No.: PCT/KR03/02816
§ 371 (c)(1),
(2), (4) Date: Sep. 21, 2006

(87) PCT Pub. No.: WO2004/079886
PCT Pub. Date: Sep. 16, 2004

(65) Prior Publication Data
US 2011/0101224 A1    May 5, 2011

(30) Foreign Application Priority Data
Mar. 6, 2003    (KR) .................. 10-2003-0014062

(51) Int. Cl.
*H01J 31/50*    (2006.01)
(52) U.S. Cl. ............... 307/125; 307/48; 307/46; 307/75; 307/87
(58) Field of Classification Search .................. 307/116, 307/125, 130, 44, 45, 48, 72, 74, 75, 87, 307/46
See application file for complete search history.

(56) References Cited

U.S. PATENT DOCUMENTS

| 4,755,725 A | * | 7/1988 | Kastendieck et al. | ........ 315/360 |
| 5,130,527 A |   | 7/1992 | Gramer et al. | .......... 250/213 VT |
| 6,278,104 B1 |  | 8/2001 | Saldana et al. | .......... 250/214 VT |

FOREIGN PATENT DOCUMENTS

| GB | 2360366 A | * | 9/2001 |
| JP | 09-285106 |   | 10/1997 |
| JP | 10-197929 |   | 7/1998 |
| JP | 10-293339 |   | 11/1998 |

OTHER PUBLICATIONS

Machine Translation for JP09-285106.*

* cited by examiner

*Primary Examiner* — Fritz M Fleming
(74) *Attorney, Agent, or Firm* — Ladas & Parry, LLP (57) ABSTRACT

Disclosed is a power supply (40) and a night vision device using the power supply (40). The power supply (40) comprises a battery (41), a power switch (42), a booster (43) for boosting a battery voltage provided by the battery (41) to an established voltage according to an operation of the power switch (42) and outputting a boost voltage, and a voltage selector (44) for comparing the voltage provided by the battery with a reference voltage (VR), outputting the boost voltage when the battery voltage is below the reference voltage (VR), and outputting the battery voltage when the battery voltage is beyond the reference voltage (VR). The night vision device is operable by voltages supplied from the power supply (40). According to the invention, stable voltages are supplied and batteries (41) are effectively used by supplying constant voltages in the case of using batteries (41) with different voltages, and hence, usage time of the night vision device is increased.

12 Claims, 5 Drawing Sheets

(a)
Prior art (b)
Present invention

12
POWER SUPPLY AND NIGHT VISION DEVICE USING THE POWER SUPPLY

BACKGROUND OF THE INVENTION (a) Field of the Invention

The present invention relates to a power supply. More specifically, the present invention relates to a power supply for supplying the power to the night vision device and using most capacity of the battery by selecting the supply voltage according to a predetermined voltage.

(b) Description of the Related Art

In general, a night vision device is used for military or police purposes in the night or darkness. The night vision device amplifies light to form images, and allows a user to easily discriminate things in the darkness. In detail, it includes a lens for focusing on a desired object, and an image intensifier for absorbing the surrounding light, converting the light into electronic patterns, changing them into light discernible by an observer, and transmitting the light to a photosensitive screen.

The above-configured night vision device uses a battery because of its portability, and the battery supplies power to the image intensifier and other circuits. A power supply of the night vision device uses a battery of 1.5 to 3V (volts).

In the case of using a 3V -battery, the night vision device operates in a battery voltage range of from 1.9 to 3.0V, and the battery must be changed if its voltage falls below 1.9V since the low voltage cannot drive the night vision device. Therefore, unnecessary battery waste occurs, since the battery cannot be used even though it has some residual voltage.

Additionally, in the case of using the 3V -battery, two 1.5V batteries are coupled to generate the voltage of 3.0V enabling the operation of the night vision device. However, the usage of 1.5V-batteries increases current consumption to thus reduce usage time of the night vision device, accordingly increasing battery waste caused by frequent changes of the batteries.

Further, conventional power supplies used for the night vision device support only one 1.5 battery or two 1.5V batteries, and hence, efficient battery usage is not possible. In addition, a long use of the image intensifier in the high light area may damage the image intensifier, and may mistakenly drive the same to increase the battery consumption.

SUMMARY OF THE INVENTION

It is an advantage of the present invention to provide the power supply for effectively using batteries by selecting different two voltages with a predetermined reference voltage.

It is another advantage of the present invention to provide a night vision device that has the ability of long use by using the power supply.

It is still another advantage of the present invention to provide a night vision device for preventing unnecessary power consumption by intercepting and supplying the power automatically according to the surrounding light condition.

In one aspect of the present invention, a power supply comprises: a battery; a power switch; a booster for boosting from the battery voltage provided by the battery to a predetermined step up voltage according to an operation of the power switch, and outputting a boost voltage; and a voltage selector for comparing the voltage provided by the battery with a reference voltage, outputting the boost voltage when the battery voltage is below the reference voltage, and outputting the battery voltage when the battery to voltage is beyond the reference voltage.

The voltage selector comprises: a voltage detector for comparing the battery voltage with the reference voltage, and outputting a first signal according to a comparison result; a first switching element operable by the first signal, for forming a first output path for outputting the boost voltage provided by the booster; and a second switching element operable according to an operation state of the first switching element, for forming a second output path for outputting the battery voltage.

The voltage selector further comprises a diode coupled between the first and second switching elements, for preventing a reverse current.

The power supply further comprises: a battery voltage sensor for comparing the battery voltage with a minimum driving voltage for driving the night vision device, and generating a second signal when the battery voltage is below the minimum driving voltage; and a battery voltage sensor including a low voltage indicate lamp according to the second signal, and warning when the battery voltage is below the minimum driving voltage.

The power supply is applied to a night vision device.

In another aspect of the present invention, a night vision device comprises: an optical system for forming a representation of a subject; an image intensifier for converting and intensifying optical signals formed by the optical system into electrical signals, converting the electrical signals into optical signals, and outputting them; a battery; a switch including a power switch; a booster for boosting a battery voltage provided by the battery to the predetermined reference voltage according to an operation of the power switch, and outputting a boost voltage; a voltage selector for comparing the voltage provided by the battery with a reference voltage, outputting the boost voltage when the battery voltage is below the reference voltage, and outputting the battery voltage when the battery voltage is beyond the reference voltage; and a supply controller operable according to a light sense signal, for providing the voltage output by the voltage selector to the image intensifier.

The voltage selector comprises: a voltage detector for comparing the battery voltage with the reference voltage, and outputting a first signal according to a comparison result; a first switching element operable by the first signal, for forming a first output path for outputting the boost voltage provided by the booster; and a second switching element operable according to an operation state of the first switching element, for forming a second output path for outputting the battery voltage.

The night vision device further comprises a high light sensor for comparing a surrounding brightness with an established brightness, and outputting a light sense signal according to a comparison result, and the supply controller terminates supply of power to the image intensifier when the high light source sensor outputs a light sense signal indicating that the surrounding brightness is greater than the established brightness, and starts supply of power again when the surrounding brightness is lower than the established brightness.

The switch further comprises an infrared operation switch, and the night vision device further comprises an infrared photodiode for emitting infrared rays according to the applied voltage when the infrared operation switch is operated.

The night vision device further comprises a coupling sensor for sensing coupling states between the night vision device and a mounting device, and outputting a corresponding coupling sense signal.

The night vision device further comprises: a voltage sensor for comparing the battery voltage with an established minimum driving voltage, and generating a second signal when the battery voltage is below the minimum driving voltage; and a battery voltage sensor including an emitter for emitting light according to the second signal, and warning that the battery voltage is below the minimum driving voltage.

The supply controller comprises: a third switching element operable by the coupling sense signal, for forming a first transfer path of the boost voltage output by the booster; a fourth switching element operable by the coupling sense signal, for forming a second transfer path of the select voltage output by the voltage selector; a fifth switching element operable by the light sense signal, for transferring the boost voltage provided through the first transfer path to the infrared emitter or the battery voltage sensor; and a sixth switching element operable by the light sense signal, for transferring the select voltage provided through the second transfer path to the image intensifier.

BRIEF DESCRIPTION OF THE DRAWINGS.

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

Figure 1:
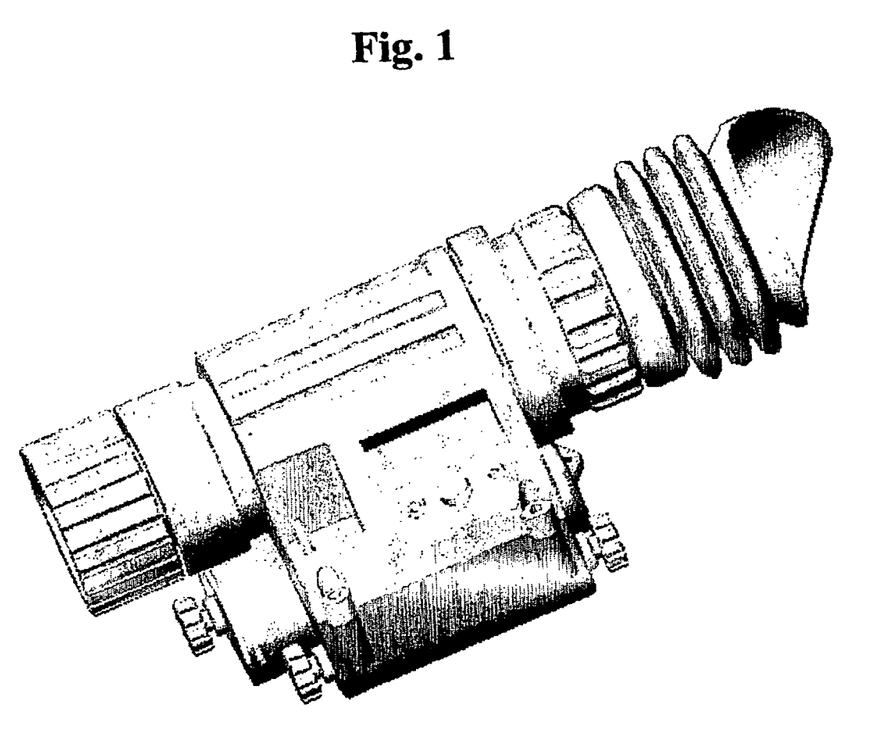
FIG. 1 shows a whole perspective view of a night vision device according to a preferred embodiment of the present invention.
Figure 2:
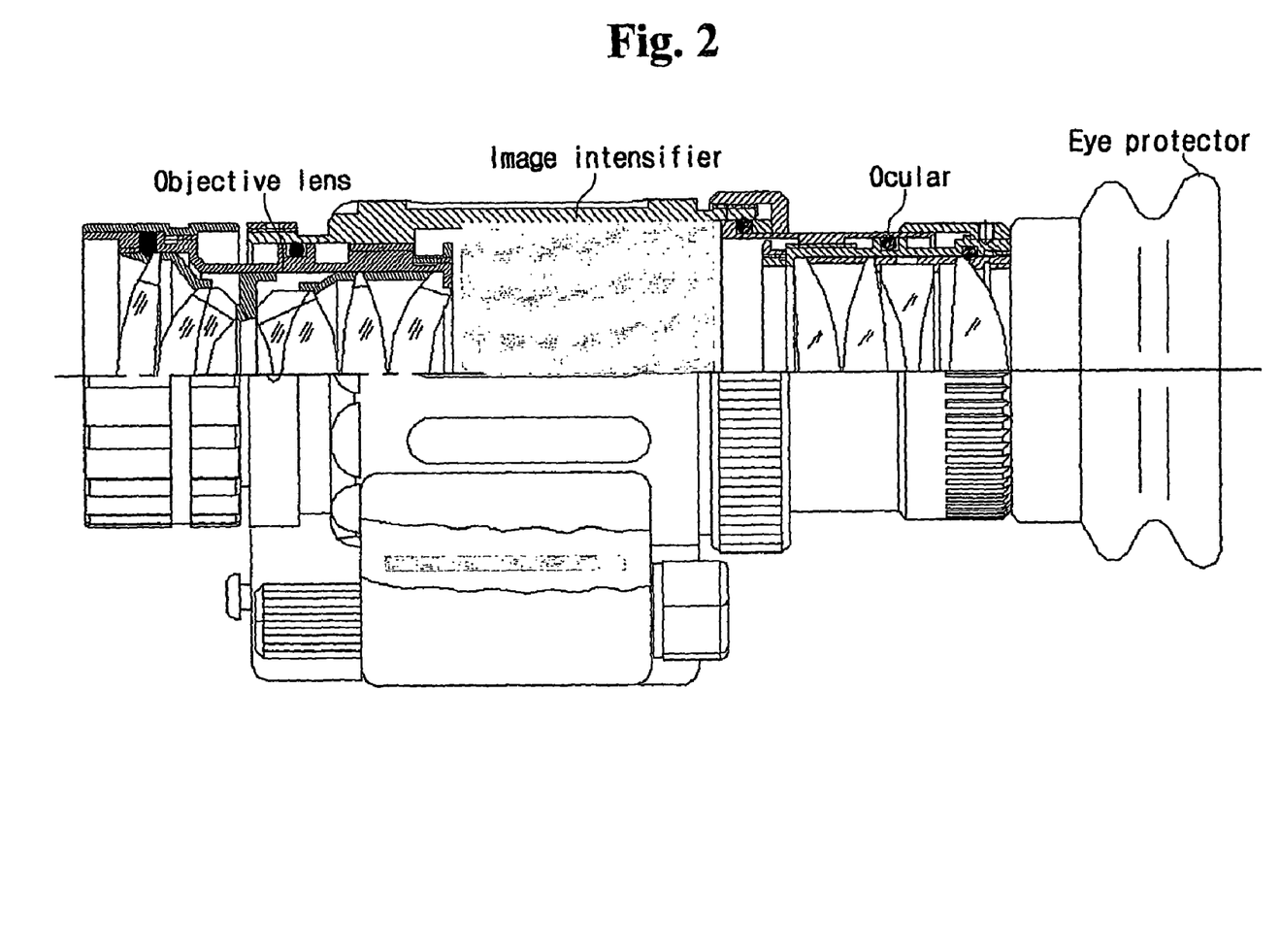
FIG. 2 shows an analytic view of a night vision device according to a preferred embodiment of the present invention.
Figure 3:
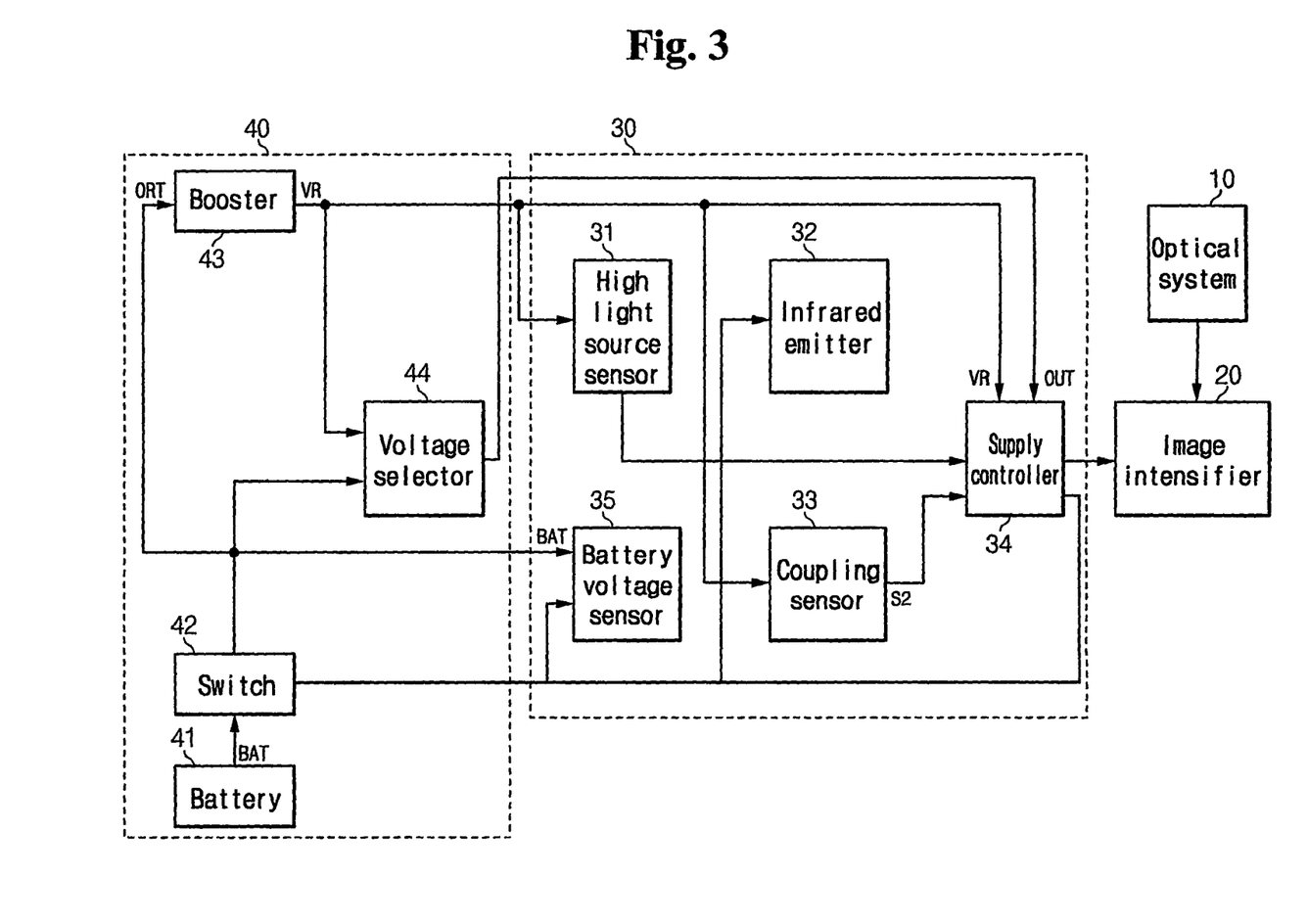
FIG. 3 shows a block diagram of a night vision device according to a preferred embodiment of the present invention.

FIG. 1 shows a whole perspective view of a night vision device according to a preferred embodiment of the present invention, FIG. 2 shows an analytic view of the night vision device according to a preferred embodiment of the present invention, and FIG. 3 shows a block diagram of the night vision device according to a preferred embodiment of the present invention.

As shown in FIGS. 1 to 3, the night vision device comprises an optical system 10 which includes an objective lens and an ocular, an image intensifier 20, a driver 30 for controlling the image intensifier 20, and a power supply 40.

The objective lens of the optical system 10 provides the light input from the surrounding area of the night vision device to the image intensifier 20, and the image intensifier 20 converts the light into electronic patterns, intensifies the electronic patterns, converts them into light, and outputs the same so that the user may view the images that correspond to the light through the ocular. An eye protector is formed on one side of the ocular to shield the user's eye, and the user accordingly puts the eye protector very closely to his eye to observe the formed images through the ocular. No further detailed description of the optical system 10 will be provided since it is known to a person skilled in the art.

The power supply 40 comprises a battery 41, a switch 42, a booster 43, and a voltage selector 44.

At least two batteries with different voltages are used for the battery 41, and a 3V battery and a 1.5V battery are used in the preferred embodiment of the present invention.

The switch 42 comprises a power switch and an infrared operation switch. Two-pole and three-stage switches are applied to the power switch and the infrared operation switch, and detailed configurations and coupling states thereof will be described later.

The booster 43 boosts the voltage applied from the battery 41 to an established voltage, and outputs the established voltage, and the voltage selector 44 either supplies the voltage output by the booster 43 or supplies the voltage of the battery 41 to the driver 30 according to the battery 41 of the voltage selector 44.

The driver 30 for operating the image intensifier 20 based on the power supplied from the power supply 40 comprises a high light source sensor 31, an infrared emitter 32, a coupling sensor 33, a supply controller 34, and a battery voltage sensor 35.

The high light source sensor 31 prevents unnecessary operation of the image intensifier 20 when the surrounding brightness is high and more than an established brightness value. In detail, the high light source detector 31 senses surrounding brightness and automatically intercepts the driving of the image intensifier 20 when the surrounding brightness exceeds the established brightness value, and automatically outputs a light sense signal S1 for driving the image intensifier 20 again when the surrounding brightness is less than the established brightness value.

The infrared emitter 32 is selectively driven according to an operation of the infrared operation switch of the switch 42 to radiate infrared rays and display radiated infrared ray states.

The coupling sensor 33 senses coupling states between the night vision device and a mounting device and outputs a corresponding coupling sense signal S2 when the user attaches the night vision device to a facial mask or a helmet so as to freely use his hands.

The supply controller 34 selectively intercepts the power provided to the image intensifier 20 from the power supply or the power provided by the infrared emitter 32 and the battery voltage sensor 35 depending on the surrounding brightness state or the coupling states of the night vision device and the mounting device.

The battery voltage sensor 35 senses whether the voltage of the battery 41 is reduced below a minimum driving voltage, and displays results.

For ease of description, the voltage directly output from the battery 41 of the power supply 40 is defined as a battery voltage BAT, the voltage output from the booster 43 is a boost voltage VR, and the voltage output from the voltage selector 44 is a select voltage OUT. The voltages are used as driving voltages for driving the image intensifier 20 and other components.

Detailed configurations and coupling states of the power supply and the driver in the night vision device according to the preferred embodiment of the present invention will now be described.

Figure 4:
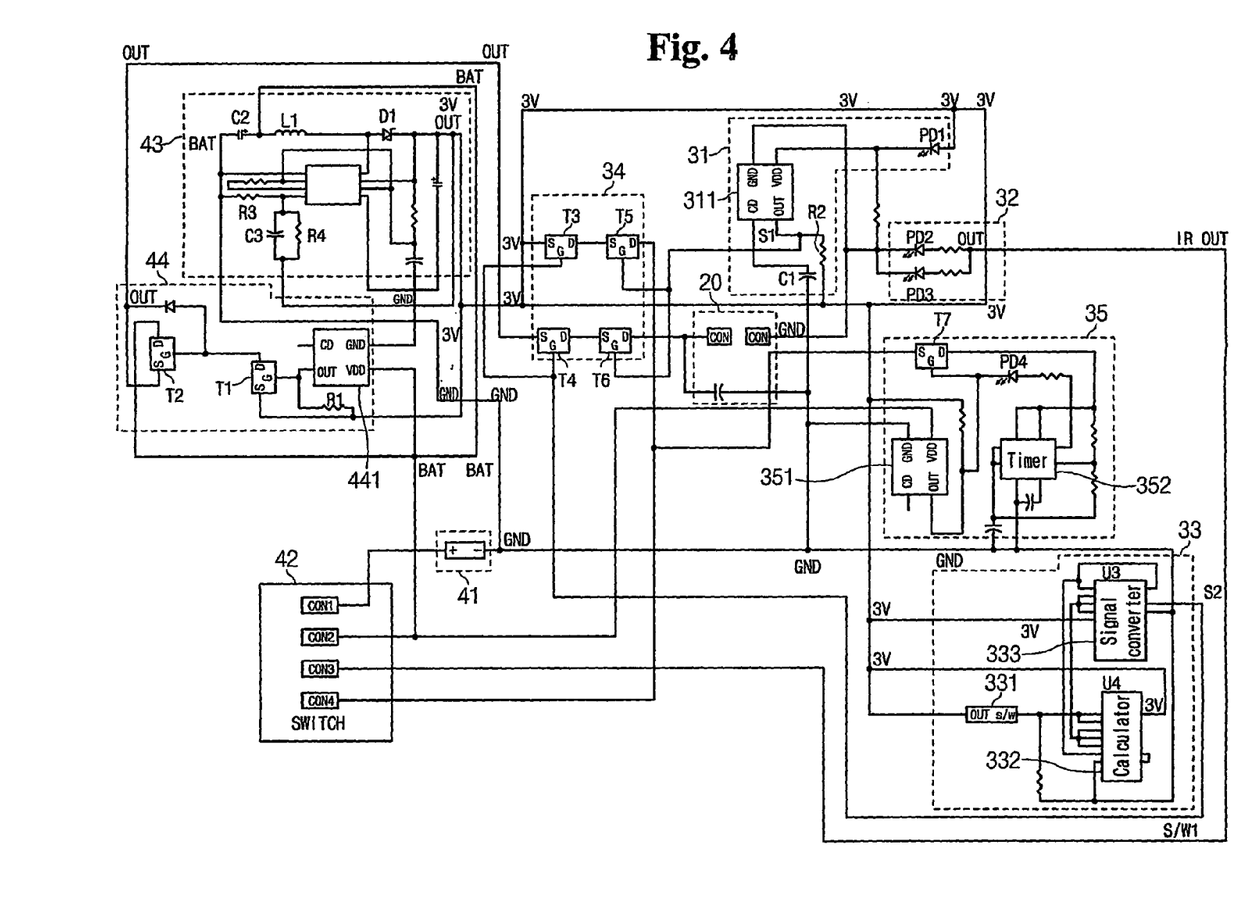
FIG. 4 shows a detailed circuit diagram of a night vision device according to a preferred embodiment of the present invention.

FIG. 4 shows a detailed circuit diagram of a night vision device according to a preferred embodiment of the present invention.

As shown, the switch 42 comprises a 2-pole 3-stage switch which includes: a first connect end CON1 coupled to the battery 41; a second connect end CON2 for supplying the battery voltage BAT to the voltage selector 44 and the booster 43 when it is coupled to the first connect end CON1 during operation by the user; and third and fourth connect ends CON3 and CON4 coupled for driving by the infrared light source.

The first connect end CON1 is coupled to the battery 41 to intercept supply of power in the case of operating the first stage of the 2-pole 3-stage switch, the first and second connect ends CON1 and CON2 are coupled to supply the power in the case of operating the second stage thereof, and the third and fourth connect ends CON3 and CON4 are coupled to supply the power to the infrared emitter 32 in the case of operating the third stage during operation of the second stage.

The voltage selector 44 for selectively supplying the battery voltage BAT applied through the switch 42 and the output voltage of the booster 43, that is, the boost voltage VR, comprises: a voltage sensor 441 having an input end VDD coupled to the second connect end CON2 of the switch 42, for sensing the voltage of the battery; a first switching element T1 having a gate end coupled to an output end of the voltage sensor 441, and a source end coupled to an output end of the booster 43; a diode D1 having an anode end coupled to a drain end of the first switching element T1; a second switching element T2 having a gate end coupled to the drain of the first switching element T1, and a drain end coupled to the output end of the battery 41; and a resistor R1 coupled between the output end of the booster 43 and the gate end of the first switching element T1.

In this instance, since a source end of the second switching element T2 and a cathode end of the diode D1 are coupled to the output end of the voltage selector 44, the boost voltage VR of the booster 43 is output through the diode D1, the battery voltage BAT is output through the second switching element T2, and the diode D1 prevents a reverse voltage between the drain end of the first switching element T1 and the gate end of the second switching element T2.

The booster 43 having an input end coupled to the output end of the battery 41 boosts an input voltage of the battery to an established voltage and outputs it. A DC/DC converter is used for the booster 43, and no configuration and operation thereof will be described, since they are known to a person skilled in the art.

The supply controller 34 of the driver 30 coupled to the power supply s 40 comprises a third switching element T3 having a gate end coupled to an output end of the coupling sensor 33, and a source end coupled to the output end of the booster 43; a fourth switching element T4 having a gate end coupled to the output end of the coupling sensor 33, and a source end coupled to the output end of the voltage selector 44; a fifth switching element T4 having a gate end coupled to the output end of the high light source sensor 31, and a source end coupled to a drain end of the third switching element T3, for forming a path for outputting the boost voltage VR; and a sixth switching element T6 having a gate coupled to the output end of the high light source sensor 31, and a source end coupled to a drain end of the fourth switching element T4, for forming a path for outputting the select voltage OUT of the voltage selector 44.

The high light source sensor 31 comprises a photodiode PD1 operable by the boost voltage VR output by the booster 43, for outputting electrical signals (brightness voltages) according to the surrounding light; a voltage sensor 311 for coupled to an output end of the photodiode PD1, for detecting whether a brightness voltage in the surroundings is greater than an established brightness voltage, and outputting a light sense signal S1; a capacitor C1 coupled to an output end CD of the voltage sensor 311 to apply the light sense signal S1 to the supply controller 34 after a predetermined time; and a resistor R2 coupled to the output end OUT of the voltage sensor 311. Accordingly, the time for outputting the light sense signal S1 to the supply controller 34 is controlled by the RC time constant of a resistor (not illustrated) built in an internal circuit of the voltage sensor 311 and the capacitor C1.

The infrared emitter 32 comprises an infrared emitting diode PD2 operable by the boost voltage VR through the third and fourth connect ends CON3 and CON4 of the switch to emit the infrared rays when the two-pole and 3-stage switch of the switch 42 is operated in the third stage; and a light emitting diode PD3 for emitting light in cooperation with the operation of the infrared emitting diode PD2 to display the infrared radiation states.

The coupling sensor 33 comprises a coupling switch 331 operable according to coupling states of the night vision device and the mounting device; a calculator 332 for determining an operation state of the switch 42 and the operation state of the coupling switch 331 to output a corresponding coupling sense signal; and a signal converter 333 for maintaining the coupling sense signal output from the calculator 332 until the night vision device coupled to the mounting device is decoupled from the mounting device by the coupling switch 331, and inverting the coupling sense signal when the night vision device is decoupled from the mounting device.

In this instance, the coupling switch 331 is a magnetic mount switch, the calculator 332 includes four NAND circuits, the signal converter 333 includes two JK flip-flops, and a resistor is coupled between the calculator 332 and the coupling switch 331. The coupling sensor 33 is not restricted to this configuration.

The battery voltage sensor 35 comprises: a voltage sensor 351 coupled to the output end of the battery 41, for sensing whether the applied voltage of the battery is less than a minimum driving voltage, and outputting a corresponding battery sense signal; a seventh switching element T7 having a gate end coupled to the output end of the voltage sensor 351, and a source end coupled to the drain end of the fifth switching element T5 of the to supply controller 34, for transmitting the applied boost voltage; a light emitting diode PD4 coupled to a gate end of the seventh switching element T7, for emitting light according to the applied boost voltage to indicate that the current voltage of the battery is below the minimum driving voltage; and a timer 352 for supplying the boost voltage output from the drain end of the seventh switching element T7 to the light emitting diode PD4 to flicker at an established time interval.

The battery voltage sensor 35 is provided in the driver 30, and can also be provided in the power supply 40. P-channel MOSFETs are applied to the switches T1 to T7 in the preferred embodiment, and the switches are not restricted to the P-channel MOSFETs.

An operation of the power supply and the night vision device using the power supply will now be described based on the above-described configuration.

Initially, the operation of the power supply 40 in the case of using a 1.5V battery will be described.

When the user operates the 2-pole 3-stage switch to be switched to the second stage from the first stage, the second connect end CON2 of the 2-pole 3-stage switch is coupled to the first connect end CON1 coupled to the battery 41, and the battery voltage BAT is input to the voltage selector 44 and the booster 43.

The booster 43 boosts the input battery voltage BAT to output a constant voltage (e.g., of from 2.8 to 3V). The boost voltage in FIG. 4 is to given as 3V.

The voltage sensor 441 of the voltage selector 44 determines the relation between the input battery voltage and the reference voltage (e.g., of from 1.9 to 2.1V), and outputs a corresponding sense signal. That is, the output voltage (the sense signal) of the voltage sensor 441 is maintained at a high level when the battery voltage is greater than the reference voltage, and the output voltage thereof is switched to a low level from the high level when the battery voltage is less than the reference voltage.

Therefore, the output voltage of the voltage sensor 441 is switched to the low level because of the 1.5V battery voltage. Accordingly, the first switching element T1 is turned on to input the boost voltage of the booster 43 to the second switching element T2 and the diode D1 through the first switching element T1, and the second switching element T2 is turned off and the boost voltage VR is output as a select voltage OUT of the voltage selector 44 through the diode D1 when the high-level voltage of 3V is applied. That is, the output path of the battery voltage BAT through the second switching element T2 is intercepted, and the boost voltage VR is output through the first switching element T1 and the diode D1. Hence, the voltage of 3V required for driving the night vision device is easily supplied in the case of using the 1.5V battery.

In the case of using the 3.0V battery, the battery voltage BAT is input to the voltage selector 44 and the booster 43, and the voltage input to the booster 43 is output as the boost voltage VR when the 2-pole 3-stage switch operates to be switched to the second stage from the first stage. In this instance, a high-level sense signal is applied to the first switching element T1 since the battery voltage of 3V is greater than the reference voltage, and accordingly, the first switching element T1 is turned off, and a low-level signal is applied to the gate end of the second switching element T2 to thus turn on the second switching element T2.

Therefore, the boost voltage output path through the first switching element T1 is intercepted, and the battery voltage BAT applied to the drain end of the second switching element T2 is output as a select voltage OUT of the voltage selector 44 through the second switching element T2. In this instance, since the battery voltage is greater than the reference voltage of the voltage sensor 441 when the battery voltage of 3V falls to 2.2V as time passes, a high-level sense signal is output, and the boost voltage of the booster 43 through the first switching element T1 is output as the select voltage OUT of the voltage selector 44 through the diode D1. Therefore, the voltage of 3V needed for driving the night vision device is easily supplied until the battery voltage is reduced to be the reference voltage in the case of using the 3V battery. The batteries of 3V and 1.5V are freely used by the power supply 40, and the battery usage efficiency is improved since the battery is used for a long time until the battery voltage falls to a predetermined voltage.

Figure 5:
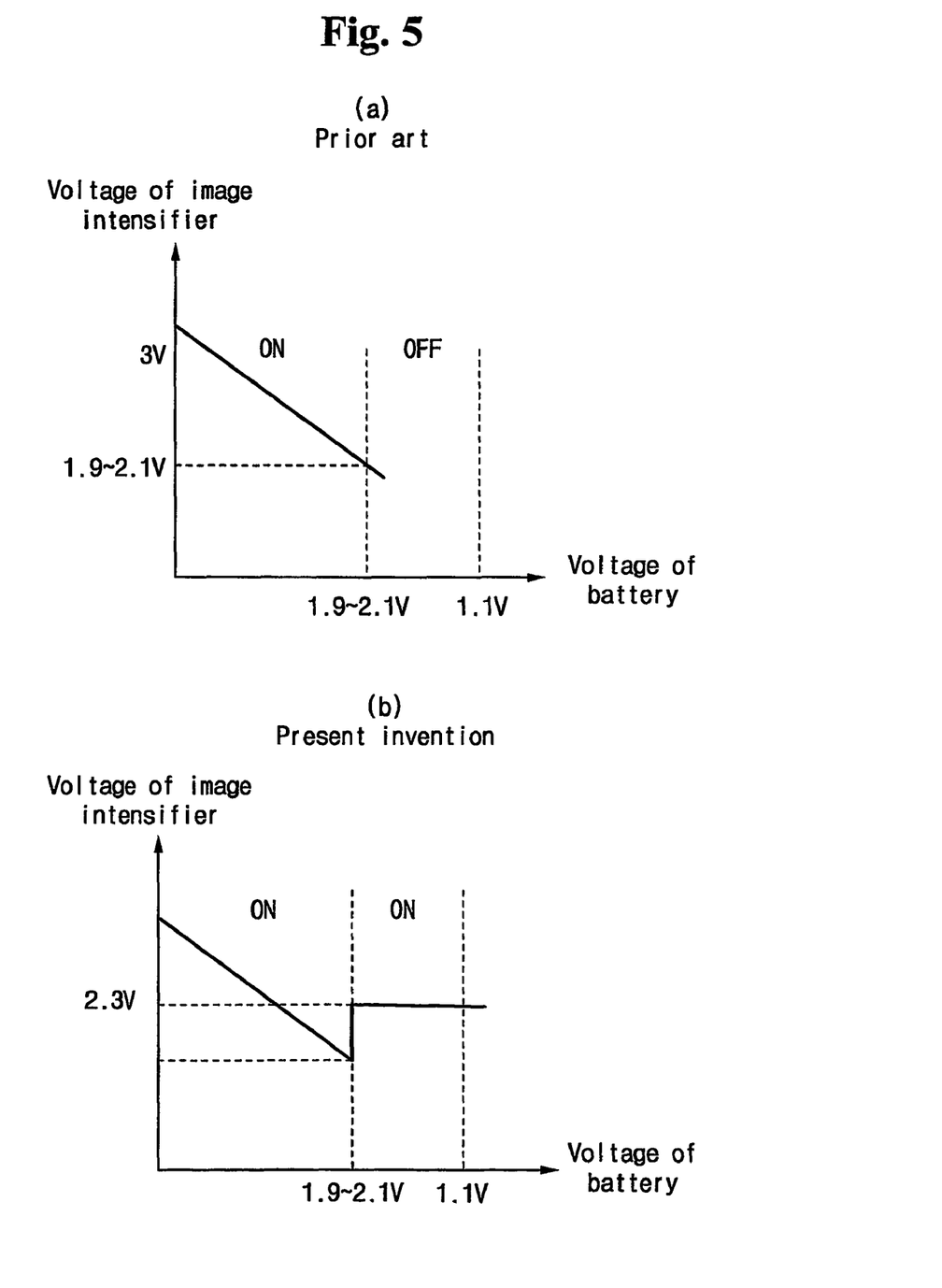
FIG. 5 shows graphs of voltage characteristics of a night vision device according to a preferred embodiment of the present invention.

FIGS. 5 shows characteristic graphs of voltages output by the power supply 40 according to the preferred embodiment of the present invention.

In the conventional case of using two batteries, as shown in FIG. 5(a), the image intensifier is operated according to the battery voltage of from 3 to 1.9V (or 2.1V), and the same is not operated when the battery voltage is less than 1.9V.

However in the preferred embodiment, as shown in FIG. 5(b), the image intensifier is operated when the battery voltage is between 3 and 1.9V (or 2.1V), and the image intensifier is also operated as described above since the voltage boosted by the booster is supplied to the image intensifier when the battery voltage is less than 1.9V (or 2.1V).

The battery voltage sensor 35 always checks whether the voltage of the battery 41 is less than an inoperable minimum driving voltage, and displays battery voltage states to the user. That is, the voltage sensor 351 of the battery voltage sensor 35 compares the established minimum driving voltage with the battery voltage BAT applied through the second connect end CON2 of the 2-pole 3-stage switch, and outputs a low-level signal when the battery voltage BAT is less than the minimum driving voltage. The seventh switching element T7 is accordingly turned on, and the light emitting diode PD4 emits light according to the voltage applied through the seventh switching element T7 to notify the user of a message that it is time to change the batteries since the current battery voltage is less than the minimum driving voltage. The timer 352 controls the light emitting diode PD4 to flicker.

The voltage (the boost voltage) output from the power supply 40 or the select voltage OUT output from the voltage selector 44 is supplied to the driver 30, and the driver 30 is accordingly operated as follows.

First, the supply controller 34 of the driver 30 supplies the voltage provided by the power supply 40 to the image intensifier 20 and the respective components 31, 32, and 35 according to the signals output by the high light source sensor 31 and the coupling sensor 33.

The high light source sensor 31 senses the surrounding brightness, and outputs a signal for operating the image intensifier only when the surrounding brightness is below the established brightness. In detail, the photodiode PD1 of the high light source sensor 31 senses the surrounding light, and outputs a corresponding electrical signal to the voltage sensor 311. The voltage sensor 311 compares the established brightness voltage with a voltage which corresponds to the input signal, and outputs a low-level light sense signal S1 when the voltage is below the established brightness voltage, and outputs a high-level light sense signal S1 when the voltage is beyond the established brightness voltage.

The coupling sensor 33 senses coupling states between the night vision device and the mounting device according to an operation by the switch 42, and outputs a corresponding coupling sense signal S2. In detail, the coupling sensor 33 outputs a low-level coupling sense signal S2 when the night vision device is not installed in the mounting device after the switch 42 is operated, outputs a low-level coupling sense signal S2 when the night vision device is installed in the mounting device, and outputs a high-level coupling sense signal S2 when the night vision device is decoupled from the mounting device.

Regarding the operation of the coupling sensor 33, the calculator 332 outputs a low-level coupling sense signal S2, and the signal converter 333 converts the low-level coupling sense signal S2 in the earlier stage when the 2-pole 3-stage switch is operated in the second stage.

When the coupling switch 331 is operated, that is, when the night vision device is installed in the mounting device, the low-level coupling sense signal S2 is output through the calculator 332 and the signal converter 333, and when the coupling switch 331 is turned off and the night vision device is decoupled from the mounting device, the calculator 332 outputs a high-level coupling sense signal S2, and the high-level coupling sense signal S2 is converted through the signal converter 333.

The respective switches of the supply controller 34 are operated according to the respective signals S1 and S2 output by the high light source sensor 31 and the coupling sensor 33, and output a driving voltage to the image intensifier 20.

When the switch 42 is switched to the second stage from the first stage, and the night vision device is not coupled to the mounting device, a low-level light sense signal S1 is output from the high light source sensor 31, and a low-level coupling sense signal S1 is output from the coupling sensor 33.

Hence, the fourth switching element T4 and the sixth switching element T6 are respectively turned on according to the low-level coupling sense signal S2 and the light source sense signal S1, and the select voltage OUT output from the voltage selector 44 is supplied to the image intensifier 20 through the fourth and sixth switching elements T4 and T6.

The image intensifier 20 converts the light input through the objective lens of the optical system 10 into electrons, amplifies them, converts them into the light again, and outputs the light through the ocular.

The third and fifth switching elements T3 and T5 of the supply controller 34 are turned on according to the low-level coupling sense signal S2 and the light sense signal S1, and the boost voltage VR output by the booster 43 is supplied to the fourth connect end CON4 of the switch 42 through the third and fifth switching elements T3 and T5. No voltage is supplied to the infrared emitter 32 since the switch 42 is operated in its second stage, and the third and fourth connect ends CONS and CON4 are turned off.

When the user switches the switch 42 to the third stage so as to emit the infrared rays since the brightness which surrounds the image intensifier 20 in the operation state is very low, the third and fourth connect ends CONS and CON4 of the 2-pole 3-stage switch are coupled with each other, and the boost voltage VR supplied through the third and fifth switching elements T3 and T5 of the supply controller 34 is supplied to the infrared emitter 32. Hence, the infrared emitting diode PD2 of the infrared emitter 32 is operated to emit infrared rays, and the light emitting diode PD3 is also operated to notify the user of the fact that the infrared rays are currently emitted. The user cannot see the area scanned by the infrared radiation light source, but can view the area through the ocular of the night vision device.

As described, the high light source sensor 31 outputs the high-level light sense signal when the surrounding brightness exceeds the established brightness and no operation by the image intensifier 20 is needed while the image intensifier 20 or the infrared emitter 32 is operated. The sixth switching element T6 of the supply controller 34 is turned off, and the select voltage OUT supplied through the fourth switching element T4 is not supplied to the image intensifier 20. Hence, the image intensifier 20 automatically intercepts its operation to prevent unnecessary battery consumption when the surrounding brightness is greater than the established brightness.

When the infrared emitter 32 is operated in this instance, the operation by the infrared emitter 32 is terminated without the user's additional manipulation. That is, no voltage is supplied to the infrared emitter 32 through the fourth connect end CON4 of the switch 42 since the fifth switching element T5 of the supply controller 34 is turned off according to the high-level light sense signal S1 and no. boost voltage is output. As a result, the driving of the infrared emitter 32 is terminated.

Also, since the fifth switching element T5 is turned off to output no boost voltage, no voltage is supplied through the seventh switching element T7 when the light emitting diode PD4 of the battery voltage sensor 35 emits light, and accordingly, the driving of the light emitting diode PD4 is to terminated.

As described, the operations of the image intensifier 20, the infrared emitter 32, and the light emitting diode PD4 of the battery voltage sensor 35 are automatically terminated when the surrounding brightness becomes greater than the established brightness while the night vision device is operated. The fifth and sixth switching elements T5 and T6 are turned on according to the low-level light sense signal S1, and the image intensifier 20, the infrared emitter 32, and the light emitting diode PD4 of the battery voltage sensor 35 start to operate when the surrounding brightness becomes lower than the established brightness.

When the night vision device is coupled to the mounting device such as a helmet and used, and then separated from the mounting device, the operation of the night vision device is automatically terminated without any additional manipulations, and the night vision device starts its operation when coupled to the mounting device.

That is, when the night vision device is connected to the mounting device, and the low-level coupling sense signal S2 output from the coupling sensor 33 is output, the third and fourth switching elements T3 and T4 of the s supply controller 34 are turned on, and accordingly, the boost voltage VR is supplied to the infrared emitter 32 and the light emitting diode PD4 of the battery voltage sensor 35 through the third and fifth switching elements T3 and T5, the select voltage OUT of the voltage selector 44 is supplied to the image intensifier 20 through the fourth and sixth switching elements T4 and T6, and the operations of infrared emission, image intensification, and low-voltage battery voltage sense display are performed. However, when the night vision device is disconnected from the mounting device and the high-level coupling sense signal S2 is output, the third and fourth switching elements T3 and T4 are turned off, and no power supply is performed, and the operations of the image intensifier 20, the infrared emitter 32, and the light emitting diode PD4 of the battery voltage sensor 35 are terminated.

Therefore, the emission operation and the image intensification operation are terminated without additional manipulation when the user attaches the night vision device to the mounting device and disconnects it from the same, and hence, it is not needed for the user to stop the operation by controlling the respective switches, and unnecessary battery usage is prevented.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims. For example, the power supply according to the preferred embodiment is applied to the night vision device, but without being restricted to this, it can be easily applied to an additional portable device that uses battery power.

As described, constant voltages are provided when batteries with to different voltages are used, thereby supplying stable voltages and enabling effective battery usage.

Also, long and stable voltage supply is allowed, and efficiency of battery use is improved by selectively supplying the boosted voltage when the battery voltage is lowered.

Further, usage time of the night vision device is increased by using the above-described power supply.

In addition, the user does not need to inconveniently control the supply of power by manually operating the switches depending on the surrounding conditions since the supply of power to the night vision device is selectively performed according to surrounding brightness or installation states of the night vision device in the mounting device, thereby maximizing the convenience of usage, and preventing unnecessary battery consumption.

What is claimed is

1. A night vision device comprising:
an optical system for forming a subject;
an image intensifier for converting and intensifying optical signals formed by the optical system into electrical signals, converting the electrical signals into optical signals, and outputting them;
a battery;
a switch including a power switch;
a booster for boosting a battery voltage provided by the battery to an established voltage according to an operation of the power switch, and outputting a boost voltage;
a voltage selector for comparing the voltage provided by the battery with a reference voltage, outputting the boost voltage when the battery voltage is below the reference voltage, and outputting the battery voltage when the battery voltage is beyond the reference voltage;
a supply controller operable according to a light sense signal, for providing the voltage output by the voltage selector to the image intensifier;
a high light sensor for comparing a surrounding brightness with an established brightness, and outputting a light sense signal according to a comparison result;
a coupling sensor for sensing coupling states between the night vision device and a mounting device, and outputting a corresponding coupling sense signal;
an infrared emitter; and
a battery voltage sensor;
wherein the supply controller comprises:
a first switching element, operable by the coupling sense signal, for forming a first transfer path of the boost voltage output by the booster;
a second switching element, operable by the coupling sense signal, for forming a second transfer path of the select voltage output by the voltage selector;
a third switching element, operable by the light sense signal, for transferring the boost voltage provided through the first transfer path to the infrared emitter or the battery voltage sensor; and
a fourth switching element operable by the light sense signal, for transferring the select voltage provided through the second transfer path to the image intensifier.

2. The night vision device of claim 1, wherein the voltage selector comprises:
a voltage detector for comparing the battery voltage with the reference voltage, and outputting a first signal according to a comparison result;
a fifth switching element operable by the first signal, for forming a first output path for outputting the boost voltage provided by the booster; and
a sixth switching element operable according to an operation state of the fifth switching element, for forming a second output path for outputting the battery voltage.

3. The night vision device of claim 1, wherein the supply controller terminates supply of power to the image intensifier when the high light sensor outputs a light sense signal indicating that the surrounding brightness is greater than the established brightness, and starts supply of power again when the surrounding brightness is lower than the established brightness.

4. The night vision device of claim 1, wherein the switch further comprises an infrared operation switch, and
the infrared emitter comprises an infrared photodiode for emitting infrared rays according to the applied voltage when the infrared operation switch is operated.

5. The night vision device of claim 1, further comprising:
a voltage detector for comparing the battery voltage with an established minimum driving voltage, and generating a second signal when the battery voltage is below the minimum driving voltage;
the battery voltage sensor including an emitter for emitting light according to the second signal, and warning that the battery voltage is below the minimum driving voltage.

6. The night vision device of claim 5, wherein the high light sensor, the infrared emitter, and the light emitter of the battery voltage sensor are operated according to the voltage supplied by the booster, and the image intensifier is operated according to the voltage output by the voltage selector.

7. A night vision device comprising:
an optical system for forming a subject;
an image intensifier for converting and intensifying optical signals formed by the optical system into electrical signals, converting the electrical signals into optical signals, and outputting them;
a battery;
a switch including a power switch;
a booster for boosting a battery voltage provided by the battery to an established voltage according to an operation of the power switch, and outputting a boost voltage;
a voltage selector for comparing the voltage provided by the battery with a reference voltage, outputting the boost voltage when the battery voltage is below the reference voltage, and outputting the battery voltage when the battery voltage is beyond the reference voltage;
a supply controller operable according to a light sense signal, for providing the voltage output by the voltage selector to the image intensifier;
a high light sensor for comparing a surrounding brightness with an established brightness, and outputting a light sense signal according to a comparison result;
a coupling sensor for sensing coupling states between the night vision device and a mounting device, and outputting a corresponding coupling sense signal; and
a battery voltage sensor including an emitter for emitting light,
wherein the high light sensor, the infrared emitter, and the emitter of the battery voltage sensor are operated according to the voltage supplied by the booster, and
the image intensifier is operated according to the voltage output by the voltage selector.

8. The night vision device of claim 7, wherein the supply controller comprises:
a first switching element operable by the coupling sense signal, for forming a first transfer path of the boost voltage output by the booster;
a second switching element operable by the coupling sense signal, for forming a second transfer path of the select voltage output by the voltage selector;
a third switching element operable by the light sense signal, for transferring the boost voltage provided through the first transfer path to the infrared emitter or the battery voltage sensor; and
a fourth switching element operable by the light sense signal, for transferring the select voltage provided through the second transfer path to the image intensifier.

9. The night vision device of claim 7, wherein the voltage selector comprises:
a voltage detector for comparing the battery voltage with the reference voltage, and outputting a first signal according to a comparison result;

a first switching element operable by the first signal, for forming a first output path for outputting the boost voltage provided by the booster; and a second switching element operable according to an operation state of the first switching element, for forming a second output path for outputting the battery voltage.

10. The night vision device of claim 7, wherein the supply controller terminates supply of power to the image intensifier when the high light sensor outputs a light sense signal indicating that the surrounding brightness is greater than the established brightness, and starts supply of power again when the surrounding brightness is lower than the established brightness.

11. The night vision device of claim 7, wherein the switch further comprises an infrared operation switch, and
the infrared emitter comprises an infrared photodiode for emitting infrared rays when the infrared operation switch is operated.

12. The night vision device of claim 7, further comprising:
a voltage detector for comparing the battery voltage with an established minimum driving voltage, and generating a second signal when the battery voltage is below the minimum driving voltage;
wherein the battery voltage sensor warns that the battery voltage is below the minimum driving voltage.

* * * * *